Aug. 26, 1952 B. N. FISHER 2,608,411

MULTISPEED RECORD PLAYER WITH AUTOMATIC TONE ARM WEIGHT COMPENSATION

Filed July 15, 1949 2 SHEETS—SHEET 1

INVENTOR.

BERNE N. FISHER

BY James and Franklin

ATTORNEYS.

INVENTOR.
BERNE N. FISHER
BY
James and Franklin
ATTORNEYS.

Patented Aug. 26, 1952 2,608,411

UNITED STATES PATENT OFFICE 2,608,411

MULTISPEED RECORD PLAYER WITH AUTOMATIC TONE ARM WEIGHT COMPENSATION

Berne N. Fisher, Roselle, N. J., assignor to General Instrument Corporation, Elizabeth, N. J., a corporation of New Jersey Application July 15, 1949, Serial No. 104,946

12 Claims. (Cl. 274—9)

The present invention relates to a record player adapted to reproduce records rotated at different speeds, and in particular to such a record player in which the effective weight of the reproducing tone arm on those records is varied automatically in accordance with the speed of the record.

Different types of disc records, adapted to be rotated for reproducing at different speeds, have long been known. The standard type of record adapted for home use is rotated at 78 R. P. M. whereas the transcription type of record used particularly for the reproduction of radio programs is adapted to be rotated at 33 R. P. M. Recently, a 33 R. P. M. record has been produced for home use, as well as one adapted to be rotated at 45 R. P. M. The non-standard records, that is to say, those not rotated at 78 R. P. M., have extremely fine grooves as compared with the standard record and as a result require not only that a different stylus be used with them than with the standard records but that the stylus pressure exerted on the record be appreciably lower than is necessary with standard records. In order to accommodate the reproduction of these various types of records, various expedients have been proposed, including the use of different tone arms for the different types of records, each tone arm having an appropriate stylus and exerting the proper stylus pressure for the record with which it is to be used. More recently, it has been proposed to employ a single tone arm having a plurality of styli and pick-up units mounted therein so as to be capable of being brought selectively into engagement with the record. One such arrangement is disclosed in my copending application, Serial No. 58,645, filed November 6, 1948, now Patent No. 2,572,712, and entitled "Dual Purpose Pick-Up Assembly and Relief Member Therefor," assigned to the assignee of the present application. The problem of obtaining the proper stylus pressure was solved in the said copending application by the use of a relief member which, when a light stylus pressure is desired, bears against the surface of the record and relieves the stylus from carrying the entire pendulous weight of the tone arm.

While the use of such a dual pick-up unit has proved entirely practical, the functioning of the relief member has presented certain problems in heavy duty applications deriving from its relative fragility.

It has been proposed by others that when the multi-stylus unit is positioned in the tone arm to bring an appropriate stylus into record engaging position, a linkage connected thereto and housed within the tone arm itself should move a counterbalancing weight, also housed in the tone arm, so as to adapt the tone arm to exert the proper stylus pressure. Such an arrangement has the disadvantage that, in an effort, usually only partly successful, to keep the tone arm light enough, the actuating link must also be extremely light and, as a result, fragile. Even if the actuating linkage does not break after continued use, it definitely tends to bend or become distorted and as a result the counterbalancing effect of the movable weight varies, so that the stylus pressure is neither constant nor dependable. When it is realized that the desired stylus pressure is between three-quarters and one and one-half ounces when standard records are employed and between one-quarter and one-half ounce when non-standard records are employed, the significance of even a slight misplacement of the counterbalancing weight becomes apparent. If the stylus pressure is too light for a given record, reproduction will be unprecise, the stylus will tend to skip grooves, and it is entirely possible that the automatic record changing apparatus might not function. If the sylus pressure is too great, the record will wear out much too rapidly and reproduction will also be distorted. Since the prime feature, insofar as the public is concerned, of the non-standard records is their high fidelity of reproduction, it would be pointless to operate them with a tone arm which, because it exerts an improper stylus pressure upon the record, causes more distortion in reproduction than is the case with standard records.

Applicant here discloses a record player which is capable of reproducing all three types of records, those which are rotated at 33, 45 or 78 R. P. M., by means of a specially constructed turntable drive, in and of itself forming no part of the present invention, which can be controlled, through manipulation of an operable control member on the record player, so as to drive the turntable at any one of those speeds depending upon the particular record reproduction of which is desired. The tone arm is provided with a multi-stylus pick-up unit which can be appropriately positioned so as to bring the proper stylus into record-engaging position. The novel feature of the disclosure, insofar as the present application is concerned, resides in the mechanism by which applicant controls the stylus pressure exerted by the tone arm. Viewed broadly, the stylus pressure is automatically coordinated with the selected speed of rotation of the turntable by means of an operative connection between the manually operable speed selecting member and the tone arm itself. This operative connection includes a spring and an overcenter linkage, the spring being active upon the tone arm in accordance with its tension so as to balance or counterbalance the tone arm and thus cause the stylus pressure to vary. Since said operative connection need not be, and preferably is not, itself carried in the tone arm, it can be of relatively rigid and strong construction so that it will be capable of withstanding long use without impairing its accuracy and effectiveness.

A particular problem is presented when, as is here the case, three separate turntable rotation speeds are employed but only two different stylus pressures need be employed. Applicant's operative connection between the manually operable control member and the tone arm is particularly adapted, by reason of its design, to perform the desired functions in a fool-proof and dependable manner. To this end an overcenter linkage is employed, the linkage assuming an intermediate position having one effect on the tone arm and a pair of extreme positions usually equally spaced from the intermediate position and having the same effect upon the tone arm, which effect is different from that exerted when the linkage is in its intermediate position. The manually operable control member has three similarly characterizable positions which are effective not only to have the desired effect upon the tone arm but also to select the appropriate turntable rotation speed corresponding to the stylus pressure.

Hence, a single control not only selects the turntable rotation speed but also, automatically, dependably, and with exactitude, determines the pressure which the stylus exerts on the record.

To the accomplishment of the foregoing advantages and to such other objects as may hereinafter appear, the present invention relates to the record player construction as defined in the appended claims and as described in this specification, taken together with the accompanying drawings, in which:

Since many of the parts of this record player, such as the means for supporting the records, the means for causing automatic record changing, and the particular means employed for driving the turntable and for achieving the desired speed of rotation thereof, form no part of the present invention and may take any of a wide variety of forms without affecting the present invention, they are not here disclosed in any detail.

Figures 1, 2:
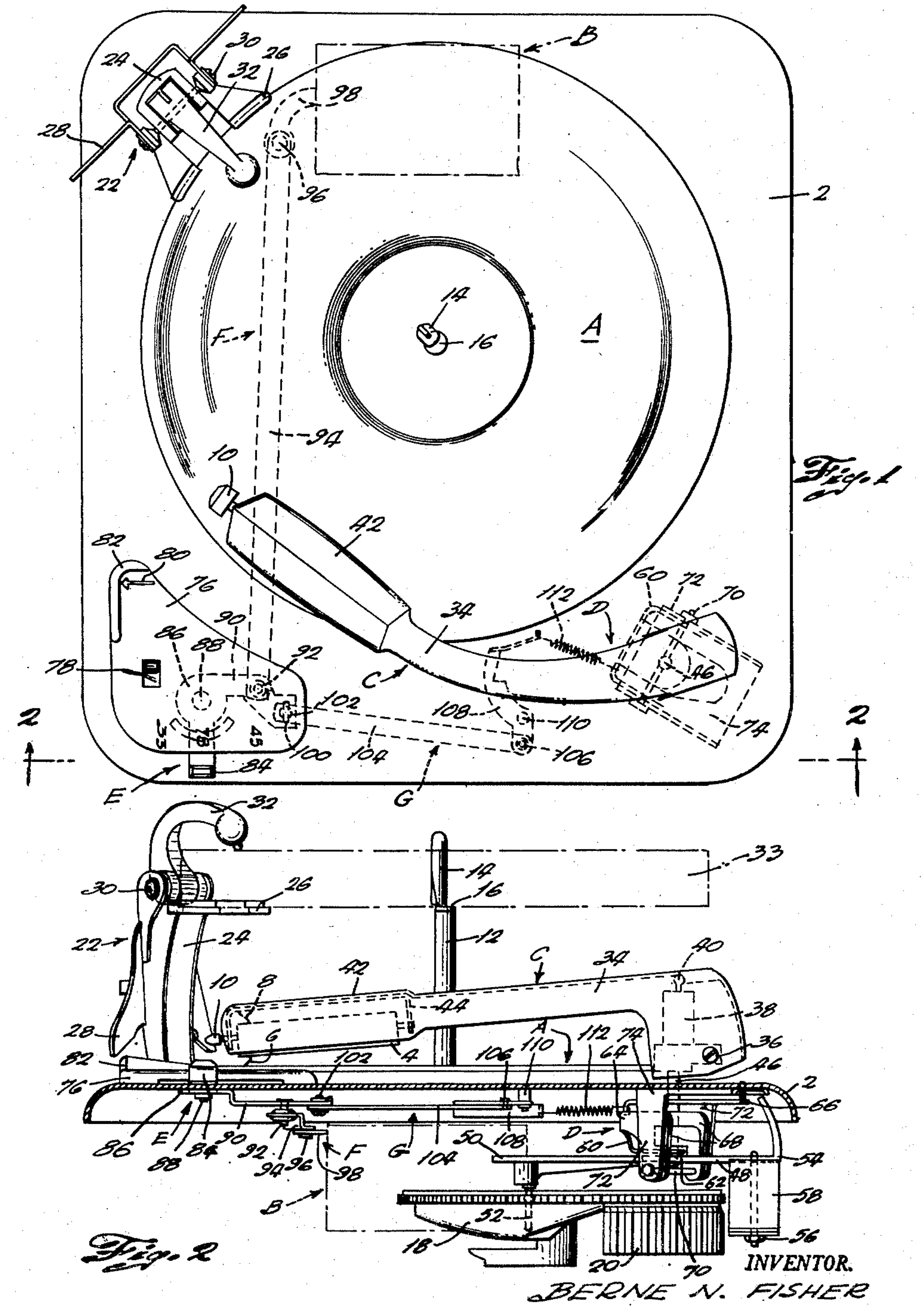
Fig. 1 is a top view of a record player embodying the present invention.
Fig. 2 is an end cross-sectional view thereof taken along the line 2—2 of Fig. 1.

The record changer comprises, insofar as the present invention is concerned, a turntable generally designated A upon which records are adapted to be placed for reproduction, the turntable A being rotatably mounted in any suitable manner upon a frame including a base plate 2, the turntable being rotated by a driving mechanism generally designated B which may take any one of a variety of forms and, for example, may comprise an electric motor which rotates a driving pulley engageable with depending rim of the turntable A. This drive is capable of operation at a plurality of speeds, and specifically at low, intermediate, and high speeds, which may cause the turntable to rotate at 33, 45 or 78 R. P. M. respectively. The drive B includes an actuatable speed selector mechanism the precise form of which is indifferent to the present invention. It may be mechanical, involving the shifting of pulleys or belts, or it may be electrical, involving electrical control of the speed of rotation of the motor itself. The record player is also provided with a tone arm generally designated C which is pivotally mounted on the base plate 2 so as to be pivotable about a substantially horizontal axis toward and away from the top surface of the turntable A and about a substantially vertical axis so as to be movable across the surface of the record on the turntable A for reproduction purposes. The tone arm carries at its extremity a pivotally mounted pick-up unit 4 having a plurality of styli 6 and 8, one of those styli being movable at a time to a stylus-engaging position through manipulation of the button 10 projecting from the end of the tone arm. In Fig. 2 the stylus 6 is shown in the stylus-engaging position. The tone arm C and the parts which it carries will have a certain weight, so that a definite pressure is exerted by the appropriate stylus 6 or 8 upon the top surface of record with which it is brought into contact. Since this stylus pressure must differ with different records, an adjustable counter-balancing system generally designated D is associated with the tone arm C, the system D being adjustable so as to vary the effective stylus pressure.

An operable control member generally designated E is provided on the frame, that control member being movable between three positions corresponding to the three speeds of turntable rotation. An operative connection generally designated F is provided between the control member E and the speed selector mechanism which forms a part of the drive B. Another operative connection generally designated G is provided between the control member E and the adjustable counterbalancing system D. As a result, whenever the control member E is positioned corresponding to a desired speed of rotation, the speed selector mechanism which forms a part of the drive B is appropriately actuated so that the turntable A will rotate at the selected speed, and the adjustable counterbalancing system D is simultaneously and automatically controlled so that whichever of the styli 6 or 8 in the tone arm C is in record-engaging position will exert the proper pressure upon the record.

In the embodiment here illustrated, the turntable A is rotatable about a central spindle 12 which has an offset portion 14 at the top thereof, a rotatable button 16 being movable between a normal position in registration with the spindle 12, so as to support a pile of records thereabove, and a position in registration with the offset portion 14 so as to engage the central aperture of the lowermost record of the stack and move that record so that its central aperture comes into registration with the spindle 12, down which the record may then fall in order to be reproduced. A three-dimensional cam 18 is rotatably mounted below the base plate 2 and is adapted, during a record changing sequence, to be rotated in any appropriate manner, the partial gear 20 thereon being adapted to rotate the button 16, as is well known. The stack of records to be reproduced are supported above the turntable at their periphery by means of the member generally designated 22, this member comprising a standard 24 pivotally mounted on the base plate 2 and having a shelf 26 on which the edges of the records are adapted to rest. The records may be of three sizes and the standard 24 may be pivotable between two positions so that the shelf 26 is spaced from the spindle 12 a distance corresponding to the size of 12 inch and 10 inch records respectively. When 7 inch records are to be reproduced, a second shelf 28 pivotally mounted at 30 on the standard 24 may be rotated clockwise approximately 270° from its position shown in Figs. 1 and 2 so as to rest upon the shelf 26 but extend further inwardly. A pressure member 32 is pivotally mounted on the top of the standard 24 and resiliently urged in a clockwise direction as viewed in Fig. 2 so as to engage the upper surface of the topmost record of the stack of records 33 supported by the shelf 26 or the shelf 28 so as to retain the records thereon and prevent accidental dislodgement thereof.

The tone arm C may take the form of a hollow shell 34 pivotally secured as at 36 to the support 38, the support having an upper stop 40 which limits the degree to which the tone arm can pivot downwardly, that stop 40 engaging the inner surface of the shell 34. The free end 42 of the tone arm C is usually somewhat wider than the body thereof and contains a bracket 44 in which the pick-up unit 4 is rotatably mounted. It will therefore be apparent that, while the free end of the tone arm C can move up and down with respect to the support 38, pivoting about the horizontal axis 36, any rotation of the support 38 about its own vertical axis will be transmitted to the tone arm C and vice versa. The vertical axis of the support 38 is defined by a shaft 46 which passes through the base plate 2, the shaft 46 at its lower end being fixed to arm 48 one end 50 of which overlies the cam 18 and is provided with a cam follower 52 which cooperates with the three-dimensional cam surface of the cam 18. The other end 54 of the arm 48 has fixedly secured thereto, as by means of the screw and bolt 56, a weight 58 which has a counterbalancing effect on the tone arm C. The shaft 46 also has secured thereto the bracket 60, this bracket including a horizontal tongue 62 secured directly to the shaft 46, a vertical portion 64, an upper horizontal portion 66 and a pair of downwardly depending side wings 68 which are pivotally secured, by means of the horizontal pin 70, to ears 72 depending from bracket 74 fixedly secured to the underside of the base plate 2. From this construction it will be apparent that the tone arm C and its support 38 are not only pivotable about the substantially vertical axis defined by the shaft 46 but are also pivotable, along with the shaft 46 about the substantially horizontal axis defined by the pin 70. The counterbalancing weight 58 acts to counteract the effect of the relatively long tone arm C, insofar as pivoting motion about the horizontal shaft 70 is concerned, so that the pressure exerted by the stylus 6 or 8 upon the upper surface of a record will be of proper value.

The switch plate 76 is mounted on the base plate 2, that plate including an on-off switch 78 for starting and stopping the motor which forms a part of the drive B, the switch plate 76 itself being movably mounted on the base plate 2 so that when it is moved in the direction of arrow 80 of Fig. 1, by engaging the finger rim 82, manual control over the automatic record changing sequence can be effected in a manner known in the art.

Projecting out from the side of the plate 76 is a button 84 attached to an L-shaped member 86 mounted below the base plate 2 so as to be pivotable about pin 88. The laterally extending arm 90 of the member 86 is connected, by means of pin 92, to rod 94 the other end of which is connected, by means of pin 96, to link 98 which enters the drive B and controls the speed selector mechanism therein. A portion of the arm 90 is slotted as at 100 and pin 102 slidable in that slot connects the arm 90 and the rod 104, the other end of that rod being pivotally connected, at 106, to one end of lever 108 which is pivotally suspended beneath the base plate 2 by means of pin 110. A spring 112 has one end secured to a portion of the lever 108 and has its other end secured to the vertical part 64 of the bracket 60, the point of attachment between the spring 112 and bracket 60 being displaced from the axis defined by the pin 70. As here disclosed, this point of connection is above the pin 70 and hence the tension of the spring acts in opposition to the counterbalancing effect of the weight 58 so as to increase the stylus pressure exerted by the tone arm. It would, of course, be equally possible to connect the spring 112 to the adjustable counterbalancing system D so that the tension of the spring would aid the counterbalancing effect of the weight 58 so as to decrease the stylus pressure exerted by the tone arm C.

The three positions to which the button 84 (the operable control member E) may be moved are indicated by the numerals 33, 78 and 45 on the switch plate 76, these numerals corresponding to the desired speeds of rotation of the turntable. It will be noted that these numerals are not arranged in numerical order but that the higher number, representing the high speed of rotation of the turntable, is positioned between the other two numbers. This is done because the same stylus pressure is useable with the 33 R. P. M. and 45 R. P. M. records and is different from (lighter than) the stylus pressure desired for the standard or 78 R. P. M. records, and because the operative connection G between the control member E and the adjustable counterbalancing system D, that mechanism comprising the rod 104, the lever 108, and the spring 112, is of the overcenter type, that is to say, the two extreme positions assumed by the portion of the lever 108 to which one end of the spring 112 is attached are equally spaced with respect to the tone arm counterbalancing system D and are differently spaced relative to the position that said portion assumes when the control member E is in its intermediate position.

Figure 3:
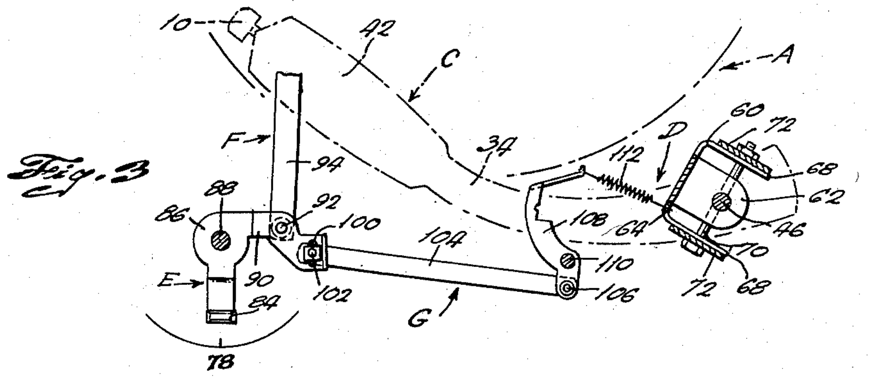
Figs. 3, 4 and 5 are schematic views illustrating the three different positions of speed selecting and tone arm counterbalancing mechanisms corresponding to the three speeds of turntable rotation.
Figure 4:
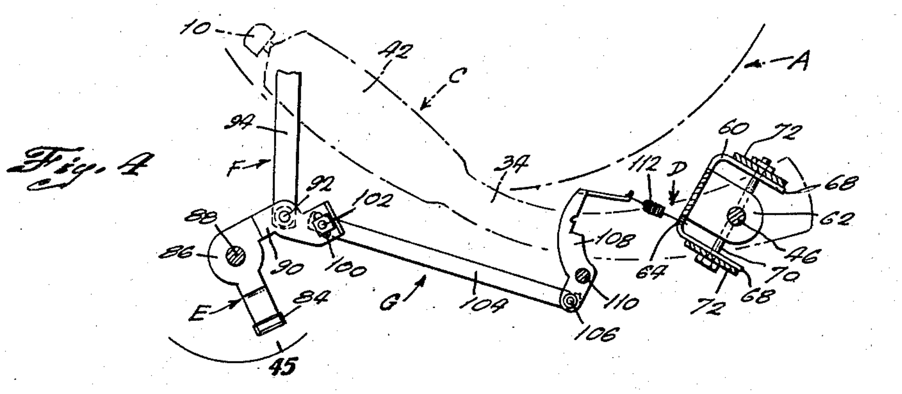
Figure 5:
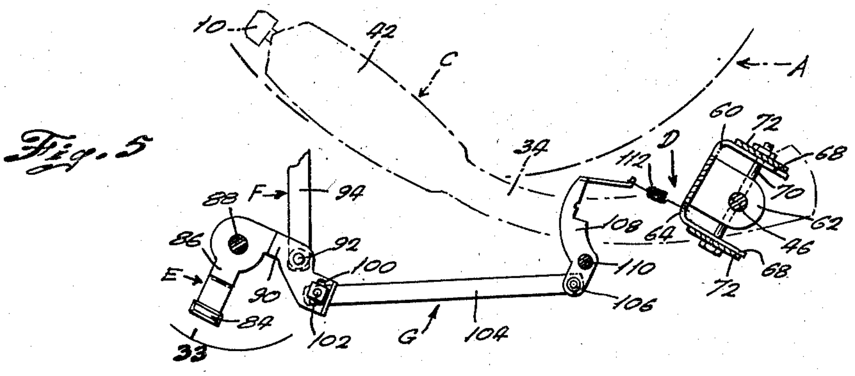

This is clearly indicated in Figs. 3, 4 and 5. In Fig. 3 the control member E is in its position corresponding to 78 R. P. M., at which time the portion of the lever 108 to which the spring 112 is connected is relatively remotely spaced from the tone arm counterbalancing system D, thus tensioning the spring 112 and hence causing the tone arm stylus pressure to increase. When the control member E is moved counterclockwise with respect to its central position to the position corresponding to a 45 R. P. M. rotation of the turntable, as illustrated in Fig. 4, the portion of the lever 108 to which the spring 112 is attached moves toward the adjustable counterbalancing system D and, as here specifically disclosed, moves sufficiently far towards the system D so that the spring 112 exerts no tension whatsoever. Hence, no force counteracting the counterbalancing effect of the weight 58 is exerted on the counterbalancing system D and as a result the stylus pressure exerted by the tone arm C increases. When the control member E is moved in a clockwise direction from its central position to its position corresponding to a 33 R. P. M. rotation of the turntable, the overcenter nature of the linkage defining the operative connection G causes the portion of the lever 108 to which the spring 112 is connected to take up a position substantially identical with that disclosed in Fig. 4, so that here again the spring 112 is untensioned and the weight 58 is permitted to exert its full counterbalancing effect upon the tone arm C, giving rise to a relatively low stylus pressure.

The operative connection F between the control member E and the speed selector mechanism of the drive B is not of the overcenter type and consequently the rod 94 will assume three different positions relative to the speed selector mechanism corresponding to the three positions of the control member E—an intermediate position as shown in Fig. 3 when the member E is in its intermediate position corresponding to 78 R. P. M., a raised position as shown in Fig. 4 when the member E is in its right hand position corresponding to 45 R. P. M., and a lowered position as shown in Fig. 5 when the member E is in its left hand position corresponding to 33 R. P. M. Hence, the speed selector mechanism in the drive B will be actuated differently for each of the three positions of the control member E, thus giving rise to a selection of one of three turntable speeds as controlled by the member E.

Since the member E and all of its linkages are supported by the fixed portion of the record changer frame, they can be relatively substantial in construction and consequently will not be subject to ready dislocation. The tone arm C is free of all non-essential parts and includes only the pick-up unit 4 and appropriate electrical connections thereto. Thus the control mechanism can be constructed in an optimum manner, and the tone arm C can be similarly constructed, the record changer thereby being exceedingly efficient and dependable. The employment of an overcenter linkage in the operative connection G between the control member E and the counterbalancing system D permits the attainment, in a simple and convenient manner, of two different stylus pressures while at the same time permitting the selection of one of three turntable speeds. The control linkages are all positioned in a relatively accessible manner so that replacement and repair is facilitated. Should the spring 112 break, it can easily be replaced and should it weaken after long continued use, it can either be conveniently replaced or, by bending or distorting the spring, it can be caused to once again exert the proper tension on the counterbalancing system D. In the embodiment here specifically disclosed, the spring 112 is untensioned for the 33 and 45 R. P. M. conditions of the record player. This has the added advantage that, when 33 and 45 R. P. M. records are being played, the spring is at rest and consequently the life of the spring is correspondingly extended.

It will be apparent that many variations may be made in the details of the instant disclosure without departing from the spirit of the invention as defined in the following claims.

I claim:

1. A record player comprising a turntable on which a record is to be placed, a drive operatively connected to said turntable, capable of operation at a low, intermediate, or high speed, as selected, and including a speed selector mechanism, a tone arm movable over the record on the turntable for reproducing the same, an adjustable counterbalancing system operatively connected to said tone arm and operable to cause its effective weight on the record to assume one of two values, a manually actuatable handle remote from said turntable operatively connected to said speed selector mechanism and movable to one of three positions so as to select a given speed of operation of the turntable, and a mechanical linkage between said handle and said adjustable counterbalancing system operable to cause the effective weight of the tone arm on the record to assume one value for the low and intermediate speeds of operation of the turntable and another value for the high speed of operation of the turntable.

2. A record player comprising a turntable on which a record is to be placed, a drive operatively connected to said turntable, capable of operation at a low, intermediate or high speed, as selected, and including a speed selector mechanism, a tone arm movable over the record on the turntable for reproducing the same, an adjustable counterbalancing system operatively connected to said tone arm and operable to cause its effective weight on the record to assume one of two values, a manually actuatable handle remote from said turntable operatively connected to said speed selector mechanism and movable to one of three positions so as to select a given speed of operation of the turntable, and a mechanical linkage between said handle and said adjustable counterbalancing system operable to cause the effective weight of the tone arm on the record to assume the lower value for the low and intermediate speeds of operation of the turntable and the higher value for the high speed of operation of the turntable.

3. A record player comprising a turntable on which a record is to be placed, a drive operatively connected to said turntable, capable of operation at a low, intermediate or high speed, as selected, and including a speed selector mechanism, a tone arm movable over the record on the turntable for reproducing the same, an adjustable counterbalancing system operatively connected to said tone arm and operable to cause its effective weight on the record to assume one of two values, a manually actuatable handle remote from said turntable operatively connected to said turntable drive and movable to one of three positions so as to select a given speed of operation of the turntable, and a mechanical linkage including an overcenter linkage between said handle and said adjustable counterbalancing system and operable to cause the effective weight of the tone arm on the record to assume one value for the low and intermediate speeds of operation of the turntable and another value for the high speed of operation of the turntable.

4. A record player comprising a turntable on which a record is to be placed, a drive operatively connected to said turntable, capable of operation at a low, intermediate, or high speed, as selected, and including a speed selector mechanism, a tone arm movable over the record on the turntable for reproducing the same, an adjustable counterbalancing system operatively connected to said tone arm and operable to cause its effective weight on the record to assume one of two values, a manually actuatable handle remote from said turntable operatively connected to said speed selector mechanism and movable to one of three positions so as to select a given speed of operation of the turntable, and a mechanical linkage including an overcenter linkage between said handle and said adjustable counterbalancing system and operable to cause the effective weight of the tone arm on the record to assume the lower value for the low and intermediate speeds of operation of the turntable and the higher value for the high speed of operation of the turntable.

5. The record player of claim 1, in which the position of the handle corresponding to the high speed of operation of the turntable is between its positions for the low and intermediate speeds of operation thereof.

6. The record player of claim 3, in which the position of the handle corresponding to the high speed of operation of the turntable is between its positions for the low and intermediate speeds of operation thereof.

7. A record player comprising a frame, a tone arm mounted thereon to pivot toward and away from a record about an axis, an operable control member movably mounted on said frame, and an operative connection including an overcenter linkage between said control member and said tone arm and connected to said tone arm at a point displaced from said axis, said connection also including a spring constantly connected to said tone arm, said control member being movable between three positions, said overcenter linkage being so connected to said control that said spring is tensioned differently when said control member is in its intermediate position than when it is in either of its extreme positions, said spring being tensioned the same amount when said control member is in either of its extreme positions, thereby causing the effective weight of said tone arm at a point remote from said axis to vary.

8. A record player comprising a frame, a tone arm mounted thereon to pivot toward and away from a record about an axis, an operable control member movably mounted on said frame, and an operative connection including an overcenter linkage between said control member and said tone arm and connected to said tone arm at a point displaced from said axis, said connection also including a spring constantly connected to said tone arm, said control member being movable between three positions, said overcenter linkage being so connected to said control member that said spring is tensioned more when said control member is in its intermediate position than when it is in either of its extreme positions, thereby causing the effective weight of said tone arm at a point remote from said axis to vary.

9. A record player comprising a frame, a tone arm mounted thereon to pivot toward and away from a record about an axis, an operable control member movably mounted on said frame, and an operative connection including an overcenter linkage between said control member and said tone arm and connected to said tone arm at a point displaced from said axis, said connection also including a spring constantly connected to said tone arm, said control member being movable between three positions, said overcenter linkage being so connected to said control member that said spring is substantially untensioned when said control member is in either of its extreme positions and is tensioned when said control member is in its intermediate position, thereby causing the effective weight of said tone arm at a point remote from said axis to vary.

10. A record player comprising a frame, a tone arm mounted thereon to pivot toward and away from a record about an axis, an operable control member movably mounted on said frame, an overcenter linkage operatively connected to said control member and having a portion to which one end of a spring is secured, the other end of said spring being constantly operatively connected to said tone arm at a point displaced from said axis, said control member being movable between an intermediate and two extreme positions, said linkage being movable thereby so that said portion is spaced at one distance from said tone arm when said control member is in its intermediate position and at another distance from said tone arm when said control member is in either of its two extreme positions, said distance being the same when said control member is in either of its two extreme positions, thus varying the tension of said spring and thereby causing the effective weight of said tone arm at a point remote from said axis to vary.

11. A record player comprising a frame, a tone arm mounted thereon to pivot toward and away from a record about an axis, an operable control member movably mounted on said frame, an overcenter linkage operatively connected to said control member and having a portion to which one end of a spring is secured, the other end of said spring being constantly operatively connected to said tone arm at a point displaced from said axis, said control member being movable between an intermediate and two extreme positions, said linkage being movable thereby so that said portion is spaced relatively close to said tone arm when said control member is in its intermediate position and relatively remote from said tone arm when said control member is in either of its two extreme positions, thus varying the tension of said spring and thereby causing the effective weight of said tone arm at a point remote from said axis to vary.

12. In the record player of claim 8, a turntable on which a record is to be placed, rotatably mounted on said frame, a drive operatively connected to said turntable, capable of operation at a low, intermediate, or high speed, as selected, and including a speed selector mechanism, and an operative connection between said control member and said speed selector mechanism for selecting the speed of operation of said turntable in accordance with the position of said control member, the intermediate position of said control member corresponding to the high speed of operation of said turntable.

BERNE N. FISHER.

REFERENCES CITED

The following references are of record in the file of this patent:

UNITED STATES PATENTS

| Number | Name | Date |
|---|---|---|
| 2,069,136 | Durand et al. | Jan. 26, 1937 |
| 2,113,401 | Goldsmith | Apr. 5, 1938 |
| 2,320,572 | Dann | June 1, 1943 |
| 2,526,188 | Andres | Oct. 17, 1950 |